US 6,751,169 B1

(12) United States Patent
Low

(10) Patent No.: US 6,751,169 B1
(45) Date of Patent: Jun. 15, 2004

(54) DISC CHANGER COMPRISING A ROLLING TRACK

(75) Inventor: Yee Check Low, Singapore (SG)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/514,172

(22) Filed: Feb. 28, 2000

(30) Foreign Application Priority Data

Mar. 5, 1999 (SG) .............................. 9901059

(51) Int. Cl.[7] .............................. G11B 17/24
(52) U.S. Cl. .................................. 369/30.97
(58) Field of Search ................. 369/30.97, 30.93, 369/30.94, 30.95, 30.96, 30.98, 30.87, 30.88, 30.85, 77.1, 192, 30.77, 30.86; 360/98.04, 98.05, 98.06

(56) References Cited

U.S. PATENT DOCUMENTS

| | | | | |
|---|---|---|---|---|
| 5,253,235 A | * | 10/1993 | Isobe et al. | 369/30.85 |
| 5,422,869 A | * | 6/1995 | Versleegers | 369/30.97 |
| 5,431,520 A | | 7/1995 | Brugger | 414/277 |
| 5,563,857 A | * | 10/1996 | Park | 369/30.98 |
| 5,715,230 A | * | 2/1998 | Choi | 369/192 |
| 6,091,677 A | * | 7/2000 | Akiyama et al. | 369/30.93 |
| 6,151,279 A | * | 11/2000 | Ikedo et al. | 369/30.98 |
| 6,163,511 A | * | 12/2000 | De Vries | 369/30.77 |
| RE37,170 E | * | 5/2001 | Kurosu | 369/77.1 |

FOREIGN PATENT DOCUMENTS

| | | |
|---|---|---|
| EP | 0516496 A2 | 12/1992 |
| EP | 0780843 A2 | 6/1997 |

* cited by examiner

Primary Examiner—Tianjie Chen

(57) ABSTRACT

A disc changer for storing disc-shaped information carriers and transporting the information carriers into and out of a scanning position in an information disc player includes a closed stationary guiding track which is bounded, viewed in a direction perpendicular to a transport direction, by a stationary rolling track and a driving member. The guiding track has a width which substantially corresponds to a diameter of the information carriers, so that the information carriers stored in the guiding track are rolled along the rolling track by cooperation of the driving member with a circumferential part of the information carriers. The guiding track is annular and is bounded by a circular cylindrical rolling surface of the rolling track and a roller of the driving member, the roller being rotatable about an axis of rotation coinciding with a common central axis of the guiding track and the rolling track. The driving member is the only part of the disc changer that is rotatable, and the disc changer does not have any further displaceable parts. Since the driving member only has a relatively small moment of inertia relative to the axis of rotation, a mechanical torque to be exerted on the driving member for transporting the information carriers is considerably reduced.

12 Claims, 3 Drawing Sheets

DISC CHANGER COMPRISING A ROLLING TRACK

FIELD OF THE INVENTION

The invention relates to the filed of a disc changers for storing disc-shaped information carriers and transporting the information carriers into and out of a scanning position.

Commonly an information disc player has a disc changer for storing disc-shaped information carriers and transporting the information carriers into and out of a scanning position. Such a player also has a turntable which is rotatable about an axis of rotation for supporting and rotating an information carrier in the scanning position, and a scanning device for scanning the information carrier in the scanning position.

A disc changer and an information disc player of the kinds mentioned in the opening paragraphs are known from WO 96/34386. The known disc changer is provided in the known information disc player and has a carousel-like support unit for the information carriers. The support unit is rotatable about an axis of rotation by means of an electrical motor and has a number of supporting surfaces for storing and supporting the individual information carriers. The information carriers are transported into and out of the scanning position by rotating the support unit carrying the information carriers about the axis of rotation of the support unit. When an information carrier has been transported into the scanning position, the information carrier is supported by the turntable of the information disc player and is scanned by means of the scanning device of the information disc player by rotating the information carrier about the axis of rotation of the turntable and by displacing a scanning unit of the scanning device in a radial direction relatively to the axis of rotation of the turntable.

SUMMARY OF THE INVENTION

The inventor recognizes that disadvantage of the known disc changer and the known information disc player is that the carousel-like support unit constitutes a rather bulky rotatable part of the disc changer having a relatively high moment of inertia. Therefore, the electrical motor for rotating the support unit and transporting the information carriers into and out of the scanning position must be able to exert a relatively high mechanical torque on the support unit.

It is an object of the invention to provide a disc changer and an information disc player of the kinds mentioned in the opening paragraphs, in which the information carriers can be transported into and out of the scanning position by means of a transport device having displaceable parts with a relatively small mass and/or rotatable parts with a relatively small moment of inertia, so that the information carriers can be transported into and out of the scanning position by means of an actuator exerting only a relatively small mechanical force or torque.

To achieve this object, a disc changer in accordance with the invention has a closed stationary guiding track for storing and guiding the information carriers, the guiding track having a transport direction and a width which, viewed in a direction perpendicular to the transport direction, substantially corresponds to a diameter of the information carriers, the guiding track being respectively bounded, viewed in a direction perpendicular to the transport direction, by a rolling track, which is stationary relative to the guiding track for cooperation with a circumferential part of the information carriers, and by a driving member for rolling the information carriers along the rolling track by cooperation with the circumferential part.

An information disc player in accordance with the invention used a disc changer in accordance with the invention.

In the disc changer in accordance with the invention, the information carriers are supported by the stationary guiding track. Since the width of the guiding track substantially corresponds to the diameter of the information carriers, the information carriers fit substantially without any tolerance between the rolling track and the driving member, so that the information carriers can be rolled by the driving member along the rolling track by the cooperation of the driving member with the circumferential parts of the information carriers. Since the guiding track is closed, the guiding track can be substantially completely filled with the information carriers, and the information carriers can be transported relatively to the guiding track in an endless manner and without hindrance in the transport direction or in a direction opposite to the transport direction. Since the guiding track and the rolling track constitute stationary parts of the disc changer, and the driving member constitutes the only displaceable and/or rotatable part of the disc changer, the mass of the displaceable parts and/or the moment of inertia of the rotatable parts of the disc changer are relatively small, so that the information carriers can be transported into and out of the scanning position by means of an actuator exerting only a relatively small mechanical force or torque.

In a particular embodiment of a disc changer in accordance with the invention, the guiding track is annular and the rolling track is circular, the driving member comprising a roller which is rotatable about an axis of rotation substantially coinciding with a common central axis of the guiding track and the rolling track and which is driveable by means of an electrical motor. In this particular embodiment, a very simple construction of the disc changer is achieved. Since the driving member uses the roller, the driving member also has a very simple construction and a very low moment of inertia.

In a further embodiment of a disc changer in accordance with the invention, the roller has an annular supporting surface which extends transversely to the axis of rotation for cooperation with a circumferential part of a main side of the information carriers. Since the roller is provided with the annular supporting surface, the information carriers are rolled along the rolling track mainly by the cooperation of the roller with the circumferential part of the main side of the information carriers, and substantially without any cooperation of the roller with the outer edges of the information carriers. In this way, it is not necessary for the information carriers to fit in a very close manner between the rolling track and the driving member to achieve the necessary cooperation between the information carriers, the rolling track, and the driving member. As a result, the width of the guiding track does not need to be very accurate, and also the loading and unloading of the information carriers into and out of the disc changer is facilitated.

In yet further embodiment of a disc changer in accordance with the invention, the guiding track has an annular supporting surface for cooperation with a main side of the information carriers, and the rolling track has a circular cylindrical rolling surface for cooperation with an outer edge of the information carriers, the supporting surface of the guiding track extending substantially perpendicularly to the axis of rotation and being bounded by the rolling track, the rolling surface of the rolling track extending substantially perpendicularly to the supporting surface of the guiding track. As a result of the cooperation of the rolling surface of the rolling track with the outer edge of the information carriers, good rolling properties of the information carriers along the guiding track without any substantial slip are achieved, so that a reliable operation of the disc changer is achieved. As a result of the cooperation of the rolling surface of the rolling track with the outer edge of the information carriers and the cooperation of the supporting surface of the guiding track with the main side of the information carriers, an accurate position of the information carriers relative to the guiding track is achieved in directions perpendicular to the transport direction.

In a particular embodiment of a disc changer in accordance with the invention is, guiding track and the rolling track are formed by a circular cylindrical recess provided in a main frame of the disc changer, wherein the guiding track is formed by a bottom part of the recess and the rolling track is formed by a side wall of the recess, the roller being rotatably journalled in the bottom part. In this manner, the guiding track and the rolling track are formed in a very simple manner, so that the construction of the disc changer is further simplified.

In a further embodiment of a disc changer in accordance with the invention, the disc changer has a detector system for detecting a presence of an information carrier in the scanning position. In the disc changer in accordance with the invention, it is principally not possible to determine a position of the information carriers in the transport direction relative to the guiding track and the scanning position as a function of a position of the driving member. As a result of the use of the detector system, the presence of an information carrier in the scanning position can be detected independently of the position of the driving member, so that it is possible to detect whether the information carrier is in a correct position to be scanned.

In yet further embodiment of a disc changer in accordance with the invention, the detector system includes two optical detectors which are arranged to detect the circumferential part of an information carrier which is present in the scanning position. As a result of the use of the two optical detectors, a reliable and accurate detection of the presence of an information carrier in the scanning position is achieved.

In a particular embodiment of an information disc player in accordance with the invention, is the guiding track, the rolling track, and the driving member of the disc changer are provided on a drawer of the information disc player which is displaceable from an operational position, in which the drawer has been retracted into a housing of the information disc player, to a loading position, in which the drawer is at least partially outside the housing. In this manner, the loading and unloading of the information carriers into and out of the information disc player is facilitated.

In a further embodiment of an information disc player in accordance with the invention, the guiding track and the rolling track of the disc changer used therein are formed by a circular cylindrical recess provided in a main frame of the disc changer, and the recess of the disc changer is provided in the drawer. In this manner, a very simple construction of the information disc player is achieved.

The invention will be further explained below with reference to the drawing, in which

DETAILED DESCRIPTION OF THE PREFERRED EMBODIMENT

Figure 1:
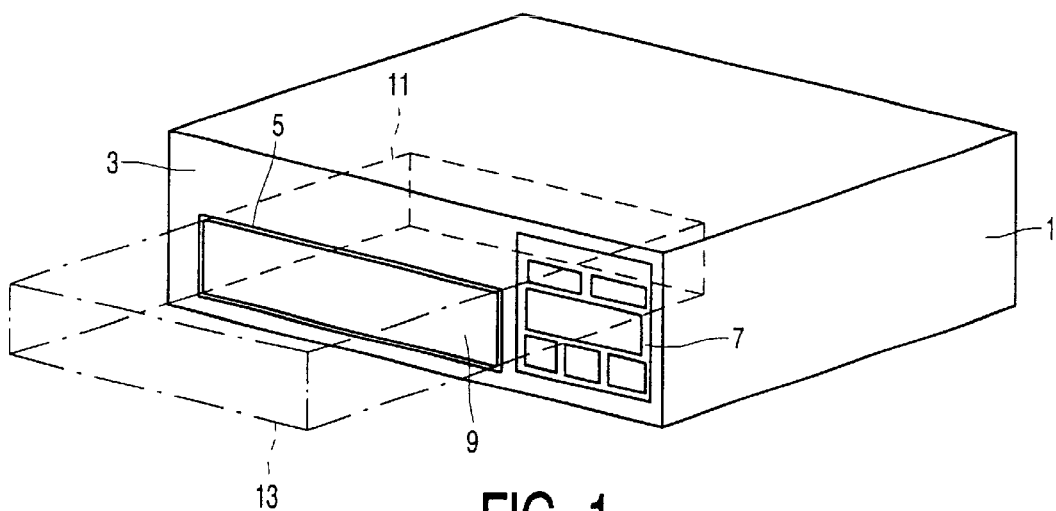
FIG. 1 schematically shows an information disc player according to the invention.
Figure 2:
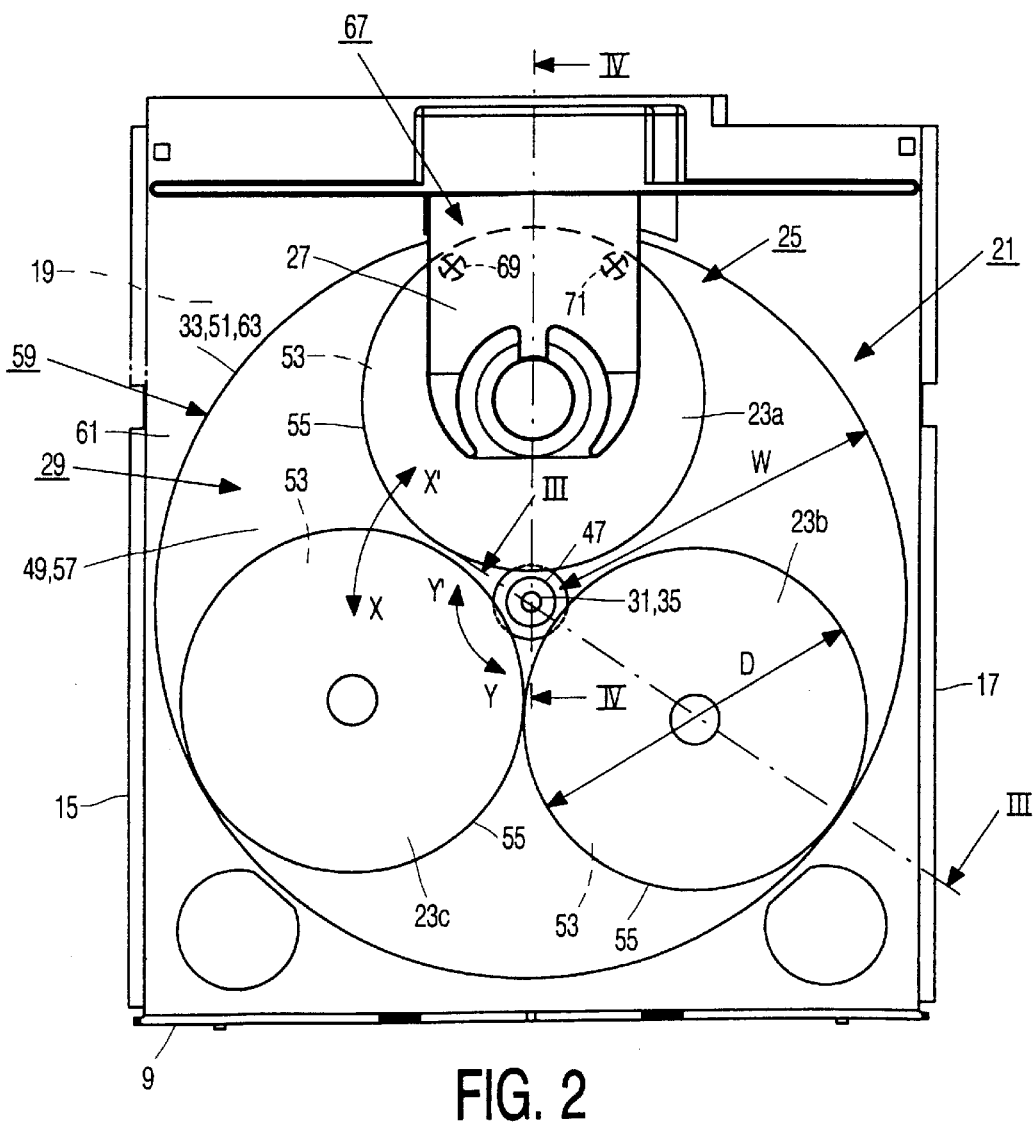
FIG. 2 shows a disc changer according to the invention, which is used in the information disc player of FIG. 1.

The information disc player according t the invention shown in FIG. 1, includes a housing 1 with a front side 3, which has an opening 5 and accommodates a control panel 7. The information disc player is further provided with a drawer 9 which is displaceable, via the opening 5, from an operational position 11, in which the drawer 9 has been retracted into the housing 1, into a loading position 13, in which the drawer 9 is at least partially outside the housing 1. For this purpose, the drawer 9, which is shown in detail in FIG. 2, is provided with two linear guiding members 15 and 17 by of which the drawer 9 is guided along two linear guiding members of the housing 1, which are not shown in the figures. The information disc player is further provided with driving apparatus (not shown) for displacing the drawer 9 into and out of the housing 1, and including, for example, a toothed rack mounted on a bottom side 19 of the drawer 9 for cooperation with a toothed wheel which is rotatably journalled relative to the housing 1 and is driveable by means of an electric motor.

Figure 3:
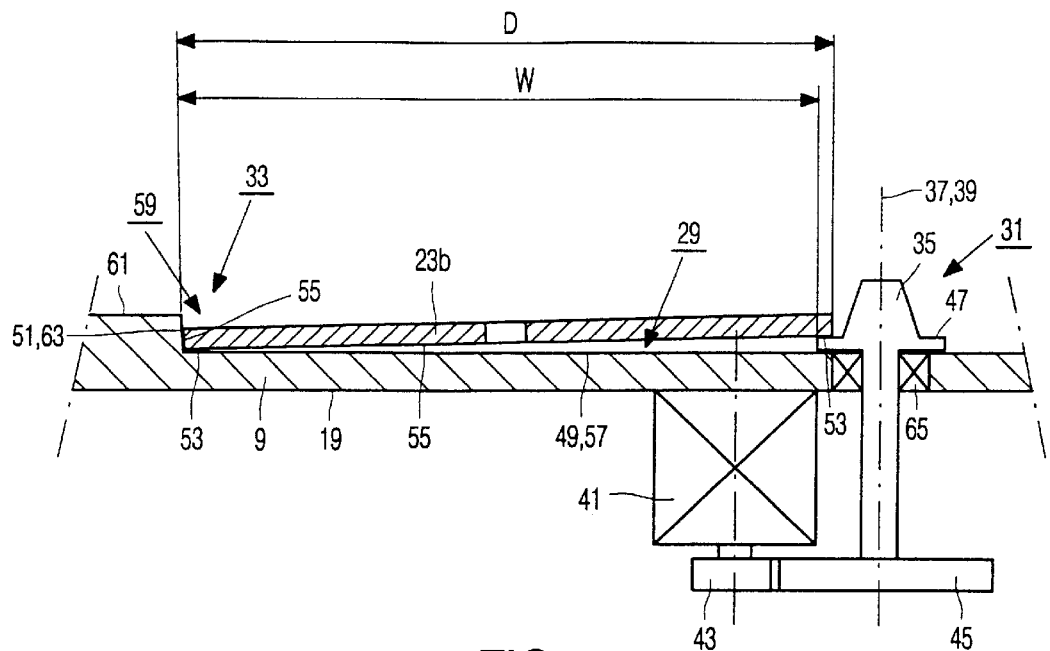
FIG. 3 shows a section taken on the line III—III in FIG. 2, FIG. 4 schematically shows a section taken on the line IV—IV in FIG. 2, and FIG. 5 schematically shows an alternative embodiment of a disc changer according to the invention.

As shown in FIG. 2, the information disc player includes a disc changer 21 according to the invention, which is provided on the drawer 9 and is used for storing a number of disc-shaped information carriers, in the embodiment shown three CDs 23a, 23b, 23c, and for selectively transporting the information carriers 23a, 23b, 23c into and out of a scanning position 25 in which the information carriers 23a, 23b, 23c can be scanned by means of a scanning device 27 of the information disc player in a manner to be described in detail hereafter. According to the invention, the disc changer 21 includes a closed or endless guiding track 29, which is stationary relative to the drawer 9 and has a transport direction X. In the embodiment shown in FIG. 2, the guiding track 29 is annular and is bounded, viewed in a radial direction perpendicular to the transport direction X, by a driving member 31 and a circular rolling track 33 which is also stationary relative to the drawer 9 and concentrically surrounds the guiding track 29. As shown in FIG. 3, the driving member 31 includes a roller 35 which is rotatable about an axis of rotation 37 substantially coinciding with a common central axis 39 of the guiding track 29 and the rolling track 33. The roller 35 is driveable by means of an electrical motor 41 via a number of gear wheels 43, 45, the motor 41 being mounted on the bottom side 19 of the drawer 9. The roller 35 includes an annular supporting surface 47 which extends transversely to the axis of rotation 37. The guiding track 29 includes an annular supporting surface 49 extending substantially perpendicularly to the axis of rotation 37. The supporting surface 49 of the guiding track 29 is bounded by a circular cylindrical rolling surface 51 of the rolling track 33, which extends substantially perpendicularly to the supporting surface 49 of the guiding track 29.

In the loading position 13 of the drawer 9 shown in FIG. 1, the disc changer 21 is easily accessible to a user of the information disc player, and the information carriers 23a, 23b, 23c can be stored in the guiding track 29 of the disc changer 21 by the user. As shown in FIGS. 2 and 3, the guiding track 29 has a width W which, viewed in a direction perpendicular to the transport direction X, substantially corresponds to a diameter D of the information carriers 23a, 23b, 23c. In the embodiment shown in FIGS. 2 and 3, width W is slightly smaller than diameter D, so that a circumferential part 53 of a main side 55 of the information carriers 23a, 23b, 23c is supported near the rolling track 33 by the supporting surface 49 of the guiding track 29 and is supported near the axis of rotation 37 by the supporting surface 47 of the roller 35. When the information carriers 23a, 23b, 23c have thus been stored in the disc changer 21, the drawer 9 is closed and one of the information carriers 23a, 23b, 23c, for example the information carrier 23b, is selected to be played. The information carrier 23b is transported into the scanning position 25 by driving the roller 35 in a counter-clockwise direction Y as shown in FIG. 2. The supporting surface 47 of the roller 35 then cooperates with the circumferential parts 53 of the information carriers 23a, 23b, 23c under the influence of friction forces, so that the three information carriers 23a, 23b, 23c are jointly rolled by the roller 35 along the rolling surface 51 of the rolling track 33, the rolling surface 51 cooperating with the outer edges 55 of the information carriers 23a, 23b, 23c. As a result, the three information carriers 23a, 23b, 23c are jointly guided along the guiding track 29 and transported in the transport direction X, so that, starting from the situation shown in FIG. 2, the information carrier 23a is transported out of the scanning position 25 and the information carrier 23b is transported into the scanning position 25. To increase the friction forces between the information carriers 23a, 23b, 23c and the supporting surface 47 of the roller 35 and to prevent any slip between the information carriers 23a, 23b, 23c and the supporting surface 47, the roller 35 including the supporting surface 47, an be made from, for example, rubber, so that a reliable operation of the disc changer 21 is achieved. Since the rolling track 33 uses the circular cylindrical rolling surface 51 for cooperation with the outer edges 55 of the information carriers 23a, 23b, 23c, good rolling properties of the information carriers 23a, 23b, 23c along the rolling track 33 without any substantial slip and accurately defined positions of the information carriers 23a, 23b, 23c in directions perpendicular to the transport direction X are achieved. The rolling properties of the information carriers 23a, 23b, 23c along the rolling track 33 can be further improved by providing the rolling surface 51 of the rolling track 33 with, for example, a rubber layer.

The driving member 31 constitutes the only main part of the disc changer 21 according to the invention which is rotatable relatively to the drawer 9, and the disc changer 21 does not have any further main parts which are displaceable relatively to the drawer 9. Since the driving member 31 only has a relatively small moment of inertia relative to the axis of rotation 37, a mechanical torque to be exerted by the electric motor 41 for rotating the driving member 31 and transporting the information carriers 23a, 23b, 23c is considerably limited, so that the motor 41 can be of a relatively small type. Since the main parts of the disc changer 21 according to the invention are constituted by the guiding track 29, the rolling track 33, and the driving member 31, the disc changer 21 is of simple construction. The construction of the disc changer 21 shown in FIG. 2 is further simplified in that the guiding track 29 is formed by a bottom wall 57 of a circular cylindrical recess 59 which is provided in an upper surface 61 of the drawer 9, in that the rolling track 33 is formed by a side wall 63 of recess 59, and in that the roller 35 is rotatably supported in bottom wall 57 by means of a journal 65. The drawer 9 thus constitutes a main frame of the disc changer 21.

In the disc changer 21 according to the invention, it is principally not possible to determine a position of the information carriers 23a, 23b, 23c in the transport direction X as a function of an angular position of the driving member 31. Therefore, as schematically shown in FIG. 2, the disc changer 21 further includes a detector system 67 by means of which the presence of one of the information carriers 23a, 23b, 23c in the scanning position 25 can be detected. The detector system 67 includes two optical detectors 69, 71 which are arranged in the supporting surface 49 of the guiding track 29 in two positions opposite to the circumferential part 53 of an information carrier 23a, 23b, 23c when this information carrier 23a, 23b, 23c is in a correct position to be scanned by the scanning device 27. As shown in FIG. 2, the optical detectors 69, 71 are arranged very close to the outer edge 55 of an information carrier 23a, 23b, 23c when this information carrier 23a, 23b, 23c is in the scanning position 25, so that an accurate and reliable detection of the presence of this information carrier 23a, 23b, 23c in the scanning position 25 is possible. Only when both detectors 69, 71 detect the presence of the circumferential part 53 of one of the information carriers 23a, 23b, 23c, this information carrier 23a, 23b, 23c is considered to be in a correct position to be scanned by the scanning device 27, and the driving member 31 is stopped. It is noted that the circumferential parts 53 of the information carriers 23a, 23b, 23c may be provided with optically detectable data about the information present on the information carriers 23a, 23b, 23c, so that the detectors 69, 71 can also be used for detecting an information carrier 23a, 23b, 23c which has been specifically selected to be played.

Figure 4:
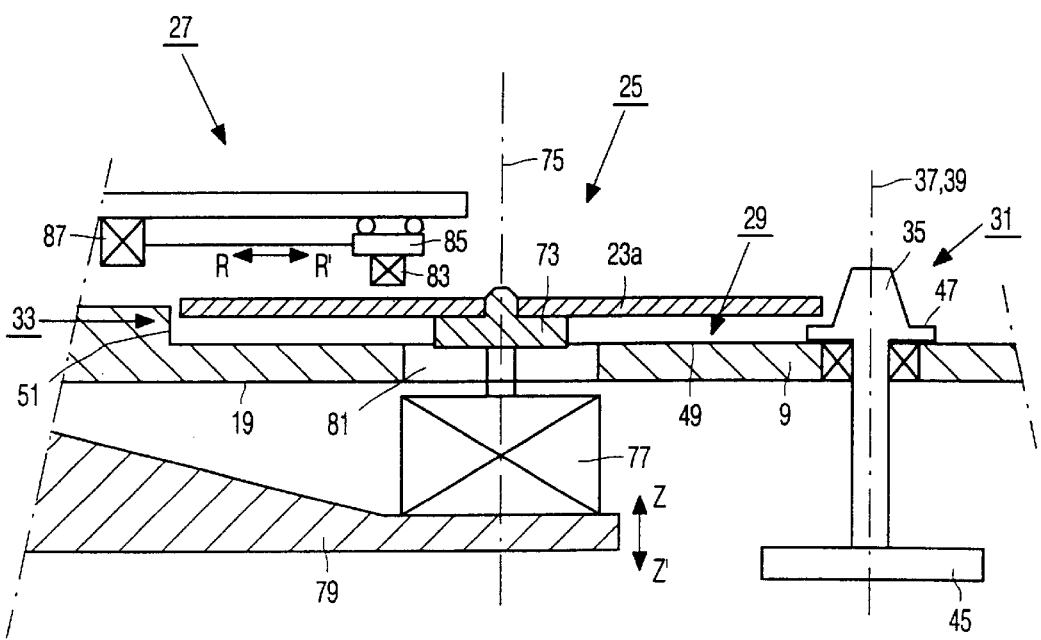

As schematically shown in FIG. 4, the information disc player further includes a turntable 73 which is rotatable about an axis of rotation 75 by means of an electric motor 77. The motor 77 and the turntable 73 are supported by a support arm 79 which is coupled to the drawer 9 so as to be displaceable in opposite directions Z and Z' perpendicular to the supporting surface 49 of the guiding track 29 by means of a driving unit not shown in FIG. 4. When the information carriers 23a, 23b, 23c are being transported along the guiding track 29, the turntable 73 is in a position below the supporting surface 49, so that the information carriers 23a, 23b, 23c can freely move along the guiding track 29. When the detectors 69, 71 detect the presence of a selected information carrier 23a, 23b, 23c in the scanning position 25, the turntable 73 is lifted through an opening 81 present in the supporting surface 49, so that the information carrier 23a, 23b, 23c present in the scanning position 25 is lifted up from the supporting surface 49 and is supported by the turntable 73. The scanning device 27 is mounted to the drawer 9 and include an optical scanning device 83, which can be of a type which is usual in optical disc players and is not shown in detail in FIG. 4. The scanning device 83 is mounted on a slide 85 which is displaceable in opposite radial directions R and R' relatively to the axis of rotation 75 of the turntable 73 by means of a displacement unit 87 mounted to the drawer 9. To scan the information present on the information carrier 23a, 23b, 23c in the scanning position 25, this information carrier 23a, 23b, 23c is rotated by the turntable 73 about the axis of rotation 75 of the turntable 73 and, simultaneously, the scanning device 83 is displaced in the radial direction R, R' by the displacement unit 87, so that the scanning device 83 follows a helical information track present on the information carrier 23a, 23b, 23c.

Since the width W of the guiding track 29 is slightly smaller than the diameter D of the information carriers 23a, 23b, 23c, and the circumferential parts 53 of the information carriers 23a, 23b, 23c are supported by the supporting surface 47 of the roller 35, it is not necessary for the information carriers 23a, 23b, 23c to fit in a very close manner between the rolling track 33 and the driving member 31. As a result, the information carriers 23a, 23b, 23c can be loaded into and unloaded from the disc changer 21 without much effort, and also the information carriers 23a, 23b, 23c can be transported by the driving member 31 in a smooth manner. Furthermore, the width W of the guiding track 29 does not have to be very accurate, so that the manufacture of the disc changer 21 is further simplified. It is noted that the invention also covers embodiments of a disc changer in which the information carriers are rolled with their outer edges along a rolling track and in which a driving member also cooperates with the outer edges of the information carriers. In such embodiments, however, the information carriers must fit substantially without any tolerance between the rolling track and the driving member to achieve a correct operation of the disc changer, so that the guiding track must have a width which is substantially equal to the diameter of the information carriers. Therefore, the expression "a circumferential part of the information carriers" in claim 1 includes both the circumferential part 53 as described before and the outer edge 55 of the information carriers.

Since the guiding track 29 is closed, the guiding track 29 can be substantially completely filled with information carriers, and the information carriers can be transported relatively to the guiding track 29 in an endless manner and without hindrance also when the guiding track 29 is substantially completely filled. It is noted, that the driving member 31 can also be rotated in a clockwise direction Y', whereby the information carriers 23a, 23b, 23c are transported in a transport direction X' opposite to the transport direction X. This is meaningful if, for example starting from the situation shown in FIG. 2, the information carrier 23c is to be transported into the scanning position 25.

Figure 5:
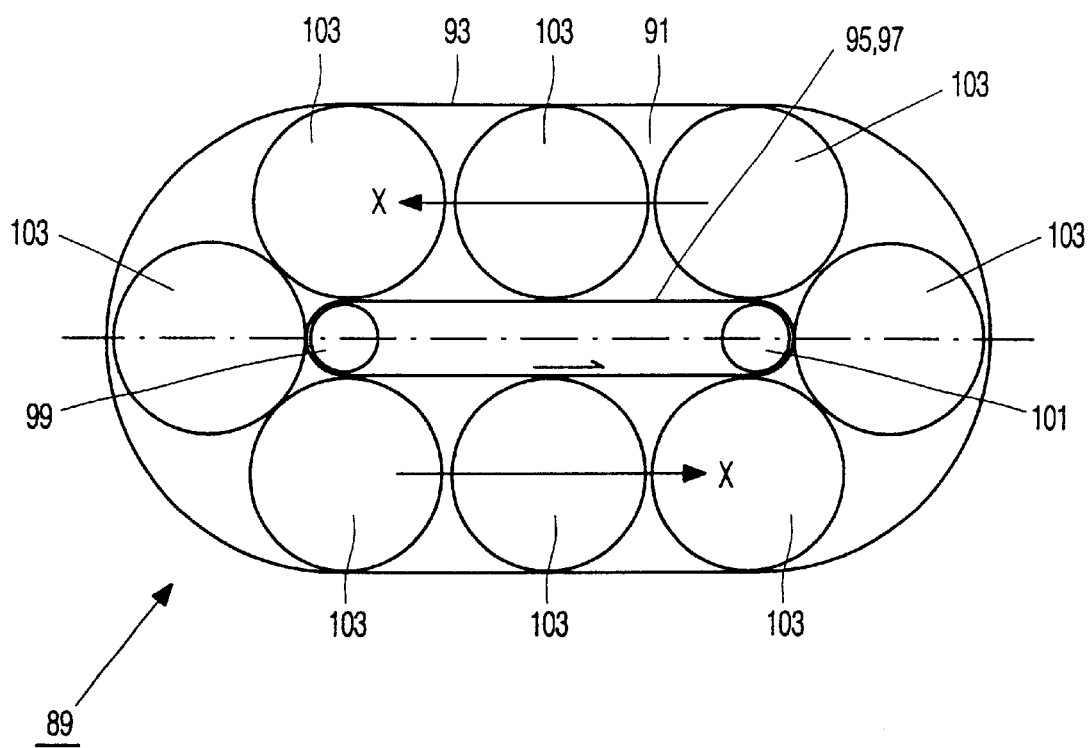

It is further noted that the invention also covers embodiments of a disc changer in which a larger number of information carriers can be stored in the disc changer. An example of such an embodiment is an embodiment in which the disc changer include an annular guiding track having an outer radius which is substantially larger than the diameter of the information carriers, and a driving member having a roller with an outer diameter which is substantially larger than the diameter of the roller 35 of the disc changer 21 of FIG. 2. Another example of such an embodiment is schematically shown in FIG. 5. The alternative embodiment of a disc changer 89 shown in FIG. 5 has an oval stationary guiding track 91 which is bounded, viewed in a direction perpendicular to a transport direction X, by an oval stationary rolling track 93 and by an oval driving member 95 which includes an endless driving belt 97 arranged around two driving wheels 99, 101. As a result of the oval shape of the guiding track 91, a maximum number of eight information carriers 103 can be stored in the disc changer 89. It is noted that the disc changers 21 and 89 described before can also be filled with a number of information carriers 23, 103 which is smaller than the maximum number of information carriers (three and eight, respectively).

It is further noted that the invention also covers embodiments of a disc changer in which the rolling track is provided at an inner side of the guiding track and the driving member is provided at an outer side of the guiding track, as well as embodiments of a disc changer in which the rolling track and/or the driving member have another construction and/or shape than the rolling tracks and driving members described before.

It is finally noted that the invention does not only cover disc changers for use in information disc players for reading and/or writing optical information discs, but also disc changers for use in information disc players for reading and/or writing magneto-optical information discs, magnetic information discs, or any other kind of information disc to be scanned by a suitable scanning device of the information disc player.

What is claimed is:

1. A disc changer comprising:
   a closed stationary guiding track for storing and guiding information carrying discs into and out of a scanning position, the guiding track having a transport direction and a width which, viewed in a direction perpendicular to the transport direction, substantially corresponds to a diameter of the information carrying discs;
   a rolling track, which is stationary relative to the guiding track for cooperation with a circumferential part of the information carrying discs; and
   a driving member for rolling the information carrying discs along the rolling track by cooperation with the circumferential part of the information carrying discs;
   and wherein, when viewed in a direction perpendicular to the transport direction, an outer boundary of the guiding track is defined by the rolling track and an inner boundary of the guiding track is defined by the driving member.

2. The changer of claim 1, in which:
   the guiding track is annular;
   the rolling track is circular; and
   the driving member includes a roller which is rotatable about an axis of rotation substantially coinciding with a common central axis of the guiding track and the rolling track and which is drivable by an electric motor.

3. The changer of claim 2, in which the roller includes an annular supporting surface which extends transversely to the axis of rotation for cooperation with only a circumferential part of a main side of the information carrying discs.

4. The changer of claim 2, in which:
   the guiding track includes an annular supporting surface for cooperation with a main side of the information carrying discs, and
   the rolling track includes a circular cylindrical rolling surface for cooperation with an outer edge of the information carrying discs, the supporting surface of the guiding track extending substantially perpendicularly to the axis of rotation and being bounded by the rolling track, the rolling surface of the rolling track extending substantially perpendicularly to the supporting surface of the guiding track.

5. The changer of claim 4, in which the guiding track and the rolling track are formed by a circular cylindrical recess provided in a main frame of the disc changer, wherein the guiding track is formed by a bottom part of the recess and the rolling track is formed by a side wall of the recess, the roller being rotatably journalled in the bottom part.

6. The changer of claim 1, in which the disc changer includes a detector system for detecting the presence of information carrying discs in the scanning position.

7. The disc changer of claim 6, in which the detector system includes two optical detectors which are arranged to detect the circumferential part of information carrying discs which is present in the scanning position.

8. The changer of claim 1, in which:
   the guiding track is annular;
   the rolling track is circular;
   the driving member includes a roller which is rotatable about an axis of rotation substantially coinciding with a common central axis of the guiding track and the rolling track and which is drivable by an electric motor;

the roller includes an annular supporting surface which extends transversely to the axis of rotation for cooperation with a circumferential part of a main side of the information carrying discs;

the guiding track includes an annular supporting surface for cooperation with a main side of the information carrying discs;

the rolling track includes a circular cylindrical rolling surface for cooperation with an outer edge of the information carrying discs, the supporting surface of the guiding track extending substantially perpendicularly to the axis of rotation and being bounded by the rolling track, the rolling surface of the rolling track extending substantially perpendicularly to the supporting surface of the guiding track;

the guiding track and the rolling track are formed by a circular cylindrical recess provided in a main frame of the disc changer, wherein the guiding track is formed by a bottom part of the recess and the rolling track is formed by a side wall of the recess, the roller being rotatably journalled in the bottom part;

the disc changer includes a detector system for detecting the presence of information carrying discs in the scanning position; and the detector system includes two optical detectors which are arranged to detect the circumferential part of information carrying discs which is present in the scanning position.

9. A disc player comprising:

a turntable which is rotatable about an axis of rotation for supporting and rotating information carrying discs in a scanning position;

a scanning device for scanning the information carrying discs in the scanning position; and a disc changer including:

a closed stationary guiding track for storing and guiding the information carrying disc, the guiding track having a transport direction and a width which, viewed in a direction perpendicular to the transport direction, substantially corresponds to a diameter of the information carrying discs;

a rolling track, which is stationary relative to the guiding track for cooperation with a circumferential part of the information carrying discs; and a driving member for rolling the information carrying discs along the rolling track by cooperation with the circumferential part of the information carrying discs;

and wherein the guiding track is bounded, when viewed in a direction perpendicular to the transport direction, by the rolling track and the driving member.

10. The player of claim 9, in which the guiding track, the rolling track, and the driving member of the disc changer are part of a drawer of the disc player which is displaceable from an operational position, in which the drawer has been retracted into a housing of the disc player, to a loading position, in which the drawer is at least partially outside the housing.

11. The player of claim 10, in which:

the guiding track is annular;

the rolling track is circular;

the driving member includes a roller which is rotatable about an axis of rotation substantially coinciding with a common central axis of the guiding track and the rolling track and which is drivable by an electric motor;

the guiding track includes an annular supporting surface for cooperation with a main side of the information carrying discs;

the rolling track includes a circular cylindrical rolling surface for cooperation with an outer edge of the information carrying discs, the supporting surface of the guiding track extending substantially perpendicularly to the axis of rotation and being bounded by the rolling track, the rolling surface of the rolling track extending substantially perpendicularly to the supporting surface of the guiding track;

the guiding track and the rolling track are formed by a circular cylindrical recess provided in a main frame of the disc changer, wherein the guiding track is formed by a bottom part of the recess and the rolling track is formed by a side wall of the recess, the roller being rotatably journalled in the bottom part; and the recess of the disc changer is part of the drawer.

12. The changer of claim 9, in which:

the guiding track is annular;

the rolling track is circular;

the driving member includes a roller which is rotatable about an axis of rotation substantially coinciding with a common central axis of the guiding track and the rolling track and which is drivable by an electric motor;

the roller includes an annular supporting surface which extends transversely to the axis of rotation for cooperation with a circumferential part of a main side of the information carrying discs;

the guiding track includes an annular supporting surface for cooperation with a main side of the information carrying discs;

the rolling track includes a circular cylindrical rolling surface for cooperation with an outer edge of the information carrying discs, the supporting surface of the guiding track extending substantially perpendicularly to the axis of rotation and being bounded by the rolling track, the rolling surface of the rolling track extending substantially perpendicularly to the supporting surface of the guiding track;

the guiding track and the rolling track are formed by a circular cylindrical recess provided in a main frame of the disc changer, wherein the guiding track is formed by a bottom part of the recess and the rolling track is formed by a side wall of the recess, the roller being rotatably journalled in the bottom part;

the disc changer includes a detector system for detecting the presence of information carrying discs the scanning position; and the detector system includes two optical detectors which are arranged to detect the circumferential part of information carrying discs which is present in the scanning position.

\* \* \* \* \*